UNITED STATES PATENT OFFICE.

GUSTAVUS J. ESSELEN, JR., OF SWAMPSCOTT, AND HARRY S. MORK, OF BROOKLINE, MASSACHUSETTS, ASSIGNORS TO CHEMICAL PRODUCTS COMPANY, OF CAMBRIDGE, MASSACHUSETTS, A CORPORATION OF MAINE.

PREPARATION OF CELLULOSE ACETATE.

1,275,884.     Specification of Letters Patent.     Patented Aug. 13, 1918.

No Drawing.     Application filed March 6, 1918. Serial No. 220,821.

*To all whom it may concern:*

Be it known that we, (1) GUSTAVUS J. ESSELEN, Jr., and (2) HARRY S. MORK, citizens of the United States residing at (1) Swampscott, (2) Brookline, in the counties of (1) Essex, (2) Norfolk, and State of (1) Massachusetts, (2) Massachusetts, have invented certain new and useful Improvements in the Preparation of Cellulose Acetate, of which the following is a specification.

This invention is a novel process of preparing the so-called "granular" cellulose acetate, especially that variety of the granular product which is freely soluble in acetone, and similar solvents. The primary advantages of our process are ease of control, improved yield of product, increased efficiency of operation, and a marked economy in the use of the active acetylating reagent, acetic anhydrid.

Commercial cellulose acetate exists in two forms or varieties, to wit, the fibrous variety, in which the product has not passed through a soluble stage and hence retains substantially the physical form of the original cellulosic fiber; and the granular variety, which is prepared by precipitating solutions of cellulose acetate obtained by direct acetylation of the fiber in presence of a solvent for cellulose acetate. The solvent employed in this case is glacial acetic acid, or mixtures of acetic acid and acetic anhydrid.

Fibrous cellulose acetate may according to the conditions of acetylation, be obtained directly either indifferently soluble or very soluble in pure acetone, and also soluble in numerous other solvents; as for example, tetrachlorethane, chloroform, methylchloracetate, methyl formate, besides numerous others; but not ordinarily soluble in commercial acetone relatively low in acetone content, in methyl acetate, in ethyl acetate, or in ethyl acetate-alcohol mixtures, or in warm alcohol-benzol mixtures.

Granular cellulose acetate is of two general types: the one being non-soluble in acetone, but soluble in the other solvents indicated above for the fibrous variety, and the other freely soluble in acetone, methylacetone, methylacetate and the like. This last-mentioned variety is known as the "granular acetone-soluble type," and is usually prepared by subjecting the solution formed by acetylating cellulose in presence of a solvent of cellulose acetate, to a subsequent treatment including the addition of water and a strong acid.

In order to insure commercially satisfactory acetylation of cellulose, it is necessary to employ a considerable excess of acetic anhydrid, which is the active acetylating agent. Under the present practice as applied to the preparation of granular cellulose acetate, this excess of anhydrid is necessarily lost as such, being converted into acetic acid either in the course of the primary precipitation of the product with water, or in the subsequent treatment for rendering the precipitate acetone-soluble.

In the preparation of cellulose acetate of the fibrous variety, on the other hand, the entire excess of acetic anhydrid remains in the acetylating mixture and can be mechanically separated (draining, pressing or centrifuging) from the acetylated fiber, and thereby recovered in condition for re-use. In this way the quantity of acetic anhydrid which is required to be added for succeeding acetylations may be reduced to a minimum point.

We have discovered that it is possible to convert the fibrous cellulose acetate, whether it be indifferently or freely soluble in acetone, into the granular acetone-soluble variety. In our preferred process we accomplish this without the employment of acetic anhydrid, and we therefore avoid the losses of this substance which have in the prior practice been regarded as unavoidable in the preparation of this desirable variety of cellulose acetate. Our preferred operating method is as follows:—

Fibrous cellulose acetate, which may be prepared in accordance with known methods, is dissolved in glacial acetic acid, which may with advantage be slightly diluted with water either before or after the preparation of the cellulose acetate solution. We add to this solution a small proportion say 1% to 5%, of a suitable catalyst, preferably hydrochloric or sulfuric acid. The mixture is then permitted to stand until a test sample, upon precipitation by water, shows that the acetate has attained the desired state of solubility. When this point is reached the acetate is precipitated in granular form, as by the addition of water.

In the above conversion of the fibrous into the granular acetate there appears to be no appreciable heat of reaction, and therefore no local overheating with excessive formation of derivatives soluble in water or in dilute acetic acid. Consequently the yields of granular acetone-soluble cellulose acetate by this method are relatively high compared with those obtainable by the direct solution method. Also since no additions of acetic anhydrid are required in the secondary treatment to produce the granular cellulose acetate from the original fibrous acetate, only that amount of acetic anhydrid is consumed which is necessary for the original fibrous acetylation; and inasmuch as the yields in the fibrous acetylation are practically theoretical, and since as indicated above a large proportion of the excess anhydrid is directly available for succeeding acetylations, the distinct economy of the present process as regards consumption of acetic anhydrid becomes apparent.

Our invention is not limited to the specific operating method described above for effecting conversion of the fibrous cellulose acetate into the granular variety, inasmuch as this conversion may be performed in other ways without departing from our invention; nor is our invention limited to the use of a catalyst in the proportions indicated above.

We claim:—

1. The process of preparing granular cellulose acetate, which consists in acetylating cellulose without destroying its fibrous form, and thereafter converting the fibrous acetate into the granular variety by a process of solution and precipitation.

2. The process of preparing granular cellulose acetate, which consists in acetylating cellulose without destroying its fibrous form, separating from the acetylated product the excess of acetic anhydrid employed in its preparation, and thereafter converting the fibrous acetate into the granular variety by a process of solution and precipitation.

3. The process of preparing granular cellulose acetate of the acetone-soluble variety, which consists in acetylating cellulose without destroying its fibrous form, separating from the acetylated product the excess of acetic anhydrid employed in its preparation, dissolving the fibrous acetate and further treating it until the desired degree of solubility is obtained, and then precipitating the product in granular form.

4. The process of preparing granular cellulose acetate of the acetone-soluble variety, which consists in acetylating cellulose without destroying its fibrous form, separating from the acetylated product the excess of acetic anhydrid employed in its preparation, dissolving the fibrous acetate and further treating it in an acetic acid solution containing a catalyst until the desired degree of solubility is obtained, and then precipitating the product in granular form.

In testimony whereof, we affix our signatures.

GUSTAVUS J. ESSELEN, Jr.
HARRY S. MORK.